United States Patent
Pinkerton et al.

(10) Patent No.: US 7,314,579 B2
(45) Date of Patent: Jan. 1, 2008

(54) HYDROGEN GENERATION MATERIAL

(75) Inventors: Frederick E. Pinkerton, Shelby Township, Macomb County, MI (US); Michael P. Balogh, Novi, MI (US); Martin S. Meyer, Southfield, MI (US); Gregory P. Meisner, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 146 days.

(21) Appl. No.: 11/231,543

(22) Filed: Sep. 21, 2005

(65) Prior Publication Data

US 2006/0057049 A1 Mar. 16, 2006

Related U.S. Application Data

(63) Continuation-in-part of application No. 10/789,899, filed on Feb. 27, 2004.

(51) Int. Cl.
 *C09K 3/00* (2006.01)
(52) U.S. Cl. .................................. 252/182.34
(58) Field of Classification Search ........... 252/182.34; 423/644, 645, 646, 647, 658.2, 413
 See application file for complete search history.

(56) References Cited

U.S. PATENT DOCUMENTS

| | | | |
|---|---|---|---|
| 4,007,257 A | 2/1977 | Lemieux et al. ............. 423/646 |
| 6,015,041 A | 1/2000 | Heung ........................ 206/70 |
| 6,159,538 A | 12/2000 | Rodriguez et al. ...... 427/213.31 |
| 6,267,229 B1 | 7/2001 | Heung ........................ 206/0.7 |
| 6,329,076 B1 | 12/2001 | Kawabe et al. ............. 428/656 |
| 6,342,198 B1 | 1/2002 | Zaluska et al. .......... 423/658.2 |
| 6,419,764 B1 | 7/2002 | Kamiya et al. ............. 148/422 |
| 6,432,379 B1 | 8/2002 | Heung ...................... 423/648.1 |
| 6,444,361 B1 | 9/2002 | Komori et al. .......... 429/218.2 |
| 6,946,112 B2 * | 9/2005 | Chen et al. ................. 423/645 |
| 6,967,012 B2 * | 11/2005 | Meisner et al. ............. 423/413 |
| 7,029,649 B2 * | 4/2006 | Meisner et al. .......... 423/658.2 |
| 2003/0113252 A1 | 6/2003 | Chen et al. ................. 423/414 |
| 2003/0129122 A1 | 7/2003 | Chen et al. .............. 423/447.3 |
| 2003/0129126 A1 * | 7/2003 | Chen et al. ................. 423/645 |
| 2004/0265222 A1 | 12/2004 | Meisner et al. .......... 423/648.1 |
| 2005/0191236 A1 | 9/2005 | Pinkerton et al. ........ 423/658.2 |
| 2005/0271581 A1 | 12/2005 | Meyer et al. ............ 423/658.2 |
| 2006/0057049 A1 | 3/2006 | Pinkerton et al. ........... 423/284 |

OTHER PUBLICATIONS

Cenzual et al., "Inorganic Structure Types with Revised Space Group", Acta Cryst., vol. B47 (1991) 433-439, no month.

Chen et al., "Hydrogen Storage in Metal Nitride Systems", Edited by Ricardo B. Schwartz, Symposium V, Materials for Energy Storage, Generation and Transport, vol. 730 (Apr. 2-4, 2002) 376 and 385.

(Continued)

*Primary Examiner*—Wayne A. Langel

(57) ABSTRACT

The dispersion of metal-element containing additives with hydrogen storage particles of the family of hydrogen-rich materials, $M'_xM''_yN_zH_d$ as specified herein, markedly lowers the temperature at which hydrogen is removed from the particles. For example, the dispersion of additives containing one or more of iron, nickel, palladium, or platinum with particles of $Li_{50}B_{17}N_{33}H_{133}$ provides a composition from which hydrogen is readily removed by heating. Use of these metals as their chloride salts makes particularly effective hydrogen release additives.

20 Claims, 2 Drawing Sheets

OTHER PUBLICATIONS

Chen et al., "Interaction of Hydrogen with Metal Nitrides and Imides", Nature Publishing Group [vol. 420] (Nov. 21, 2002) 302-304 with Supplement pp. 1-6.

Goubeau, et al., "Über ternäre Metall-Bornitride", Zeitschrifte für anorganische und allgewieine, Chemic vol. 310 (1961) 248-260, no month.

Hu et al., "Ultrafast Reaction between LiH and $NH_3$ during $H_2$ Storage in $Li_3N$"; J. Phys. Chem. A; vol. 107, No. 46 (Nov. 20, 2003) 9737-9739.

Ichikawa et al., "Mechanism of Novel Reaction for LiNH and LiH to $Li_2NH$ and $H_2$ as a Promising Hydrogen Storage System"; J. Phys. Chem. B; vol. 108, No. 23 (May 5, 2004) 7887-7892.

Jacobs et al., "Preparations and Properties of Magnesium Amide and Imide", Journal for Anorganic and General Chemistry, Band [vol.] 870 (1969) 254-261. (English translation only; original German not available), no month.

JCPDS X-Ray Database; pattern No. 00-007-0245—$Li_3AlN_2$, no date.

JCPDS X-Ray Database; pattern No. 00-036-1016—β-$Mg_3B_2N_4$, no date.

JCPDS X-Ray Database; pattern No. 00-042-0868—$Mg_3BN_3$, no date.

JCPDS X-Ray Database; pattern No. 00-044-1497—$Mg_3BN_3$, no date.

JCPDS X-Ray Database; pattern No. 16-273—$Li_3BN_2$, no date.

JCPDS X-Ray Database; pattern No. 40-1166—$Li_3BN_2$, no date.

JCPDS X-Ray Database; pattern No. 80-2274—$Li_3BN_2$, no date.

Juza et al., "Die ternären Nitride $Li_3AlN_2$ und $Li_3GaN_2$"; Zeitscrifte für Anorganische Chemic, vol. 257 (1948) 13-25, no month.

Juza et al., "Metal amides and metal nitrides", 25th Part, Journal for Anorganic and General Chemistry, 1951 vol. 266, 325-330. (English translation and German language document), no month.

Pinkerton et al., "Hydrogen Desorption Exceeding Ten Weight Percent from the New Quaternary Hydride $Li_3BN_2H_8$" ACS Publications, http://pubs.acs.org/cgi-bin/abstract.cgi/jpcbfk/2005/109/i01/abs/jp0455475.html, no month.

Pinkerton et al., "Bottling the Hydrogen Genie", The Industrial Physicist, (Feb./Mar. 2004) 20-23.

Villars et al., "ASM International Handbook of Ternary Alloy Phase Diagrams", Al Li N; $AlLi_3N_2$ (1) Crystallographic Data (1997), no month.

Villars et al., "ASM International Handbook of Ternary Alloy Phase Diagrams", B Li N; $BLi_3N_2$ (LT) (2) Crystallographic Data (1997), no month.

Villars et al., "ASM International Handbook of Ternary Alloy Phase Diagrams", B Li N; $BLi_3N_2$ (HT) (2) Crystallographic Data (1997), no month.

Villars, P., "Pearson's Handbook Desk Edition", Crystallographic Data for Intermetallic Phases, Ac—$Cr_2Se_4Zr$, vol. 1, p. 416 (1997) 771 and 776, no month.

Yamane et al., "High- and Low-Temperature Phases of Lithium Boron Nitride, $Li_3BN_2$ Preparation, Phase Relation, Crystal Structure, and Ionic Conductivity", J. Solid State Chemistry, vol. 71, 1987) 1-11, no month.

Yamane et al., "Structure of a New Polymorph of Lithium Boron Nitride, $Li_3BN_2$", J. Solid State Chemistry, vol. 65, (1986) 6-12, no month.

\* cited by examiner

HYDROGEN GENERATION MATERIAL

CROSS-REFERENCE TO RELATED APPLICATION

This application is a continuation-in-part of co-pending application U.S. Ser. No. 10/789,899, filed Feb. 27, 2004, titled Mixed Hydrogen Generation Material, and assigned to the assignee of this invention.

TECHNICAL FIELD

This invention pertains to the release of hydrogen from members of a family of hydrogen-rich materials exemplified by $Li_{50}B_{17}N_{33}H_{133}$. More specifically, this invention pertains to dispersions of additive particles with particles of the hydrogen storage compositions to facilitate the release of hydrogen.

BACKGROUND OF THE INVENTION

Co-pending patent application Ser. No. 10/789,899, titled Mixed Hydrogen Generation Material, and filed Feb. 27, 2004 describes a family of new materials for the storage of hydrogen and methods of making such materials. The materials are characterized by the formula $M'_xM''_yN_zH_d$ in which (a) M' is a cation selected from the group consisting of Li, Ca, Na, Mg, K, Be, and mixtures thereof, and x is in the range from about 50 to about 53; M" comprises one or more cations selected from Group 13 elements of the Periodic Table (IUPAC notation), and y is in the range from about 5 to about 34; (c) N is nitrogen and z is in the range from about 16 to about 45; (d) H is hydrogen and d is in the range from about 110 to about 177; and (e) M', M", x, y, and z are selected to maintain electroneutrality.

The disclosed family of hydrogen storage materials includes a new quaternary hydrogen-rich compound (or mixture) that is made by chemically combining two mole parts of lithium amide ($LiNH_2$) with one mole part of lithium borohydride ($LiBH_4$). This product has a composition close to $Li_{50}B_{17}N_{33}H_{133}$ and will be referred to by this formula throughout this specification. It contains a compound whose composition has been tentatively identified to be approximately $Li_3BN_2H_8$. Thus, hydrogen is a significant atomic component of each of the precursor compounds and it is retained in the quaternary product molecule as about 11.9 weight percent of the material. $Li_{50}B_{17}N_{33}H_{133}$ melts at about 190° C. and releases much of its hydrogen (more than 10 wt % of the hydride) when progressively heated in a suitable chamber to about 350° C. After the hydride particles are added to the chamber it may be initially evacuated, or an inert gas or hydrogen may be flowed through the chamber. Thus, this material and its family members offer convenient compounds in which to store releasable hydrogen, particularly for mobile power requirements.

The above identified patent application is incorporated herein by reference for its disclosure of the family of hydrogen storage materials and their preparation and properties. Moreover, a related publication by the inventors herein, "Hydrogen Desorption Exceeding Ten Weight Percent from the New Quaternary Hydride $Li_3BN_2H_8$" in The Journal of Physical Chemistry B, 2005, 109, pages 6-8 is incorporated into this specification by reference. This publication also describes syntheses of $Li_{50}B_{17}N_{33}H_{133}$ (in terms of its equivalent nominal formula, $Li_3BN_2H_8$) and the removal of hydrogen from the quaternary compound by heating to temperatures above about 250° C. This release temperature is undesirably high for mobile applications of hydrogen power.

There remains a need to reduce the temperature of release of hydrogen from these new hydrogen storage materials, preferably below the melting point of the materials, and to increase the rate of release of the hydrogen gas. It is an object of this invention to provide certain additives that enhance the release of hydrogen from the stated family of hydrogen-rich compounds.

SUMMARY OF THE INVENTION

The practice of the invention will be described using $Li_{50}B_{17}N_{33}H_{133}$ as an exemplary composition. However, the practice of the invention is applicable to all members of the family of hydrogen storage materials described in the parent application of this case.

The release of hydrogen from $Li_{50}B_{17}N_{33}H_{133}$ can be observed quantitatively by heating a sample under suitable conditions in a thermogravimetric analyzer (TGA). For example, the sample may be heated under flowing inert gas, such as argon or helium, at atmospheric pressure at a rate of 5° C./min over a temperature range from 30° C. to 400° C. The decreasing weight of the sample is measured and the quantity and composition of the evolved gas is analyzed. A small amount of ammonia may also be produced during the heating of the quaternary hydride. In a typical TGA test of the $Li_{50}B_{17}N_{33}H_{133}$ half of the hydrogen is released when the sample has reached a temperature of about 328° C. (i.e. $T_{1/2}$=328.6° C.). This $T_{1/2}$ value from the described TGA test for the release of hydrogen from additive-free $Li_{50}B_{17}N_{33}H_{133}$ is a basis of comparison for the evaluation of candidate metals or metal-containing substances added to enhance the release of hydrogen.

In accordance with this invention, hydrogen can be recovered at a lower temperature and at a higher heating rate by suitable incorporation of certain metals or metal-containing additives with or into the particles of the hydrogen storage material, e.g. $Li_{50}B_{17}N_{33}H_{133}$. For example, individual metals and metal compounds have been added to $LiNH_2$ and $LiBH_4$ (used in a 2:1 molar ratio) prior to ball-milling these precursor powders in the synthesis of $Li_{50}B_{17}N_{33}H_{133}$.

Platinum has thus been added to $Li_{50}B_{17}N_{33}H_{133}$ precursors as micrometer sized particles, as nanometer size particles supported on a high surface area carbon, and as platinum chloride. Each form of addition to the quaternary has enhanced the release of hydrogen as seen in the lowering of $T_{1/2}$ values in TGA analyses. Another noble metal, palladium, has likewise been effective as micrometer size particles and as palladium chloride.

Nickel additions have demonstrated increasing effectiveness in promoting hydrogen release from $Li_{50}B_{17}N_{33}H_{133}$ as the particle size of the nickel particles was reduced from about 50 micrometers to less than 40 nanometers. And nickel(II) chloride has proven very effective in reducing the release temperature of hydrogen. Similarly the use of ferrous chloride is much more effective than 100 micrometer size iron particles.

Titanium(III) chloride, zinc metal, zinc chloride, graphite, and high surface area carbon particles have had little effect in promoting the release of hydrogen from $Li_{50}B_{17}N_{33}H_{133}$.

While the mechanism by which metal and metal-containing additives promote hydrogen release is undetermined, the highly dispersed nanoparticle distribution revealed by transmission electron microscopy (TEM) strongly suggests that Ni, Fe, Pd, and Pt act as dehydrogenation catalysts for $Li_{50}B_{17}N_{33}H_{133}$. This interpretation is consistent with the dramatic effect of small additions on the 50% hydrogen release temperature ($T_{1/2}$) as will be shown in more detail in the examples. The interpretation of catalytic activity is also supported at least qualitatively by the scaling of the shift in the characteristic release temperature $T_{1/2}$ with the specific surface area (and hence the inverse of the size) of different additive particle morphologies. This shift in $T_{1/2}$ is usually designated $\Delta T_{1/2}$ in this specification.

The metal and/or metal element-containing additives are added in amounts found suitable to promote the release of hydrogen from a selected hydrogen storage composition. It will generally be preferred to determine minimum effective amounts of the additives for the purpose of limiting the required weight and volume of hydrogen storage material. But the additives may be added in amounts up to about 25% by weight or so of the storage material to promote the release of the bound hydrogen. Further, as illustrated in this specification, the metal-containing additives may be added to or mixed with precursor compounds for making the hydrogen storage compositions, or the metal containing additives may be mixed with or dispersed into pre-synthesized hydrogen storage compositions.

Other objects and advantages of the invention will become apparent from a description of preferred embodiments.

DESCRIPTION OF PREFERRED EMBODIMENTS

Experimental Details

Figure 1:
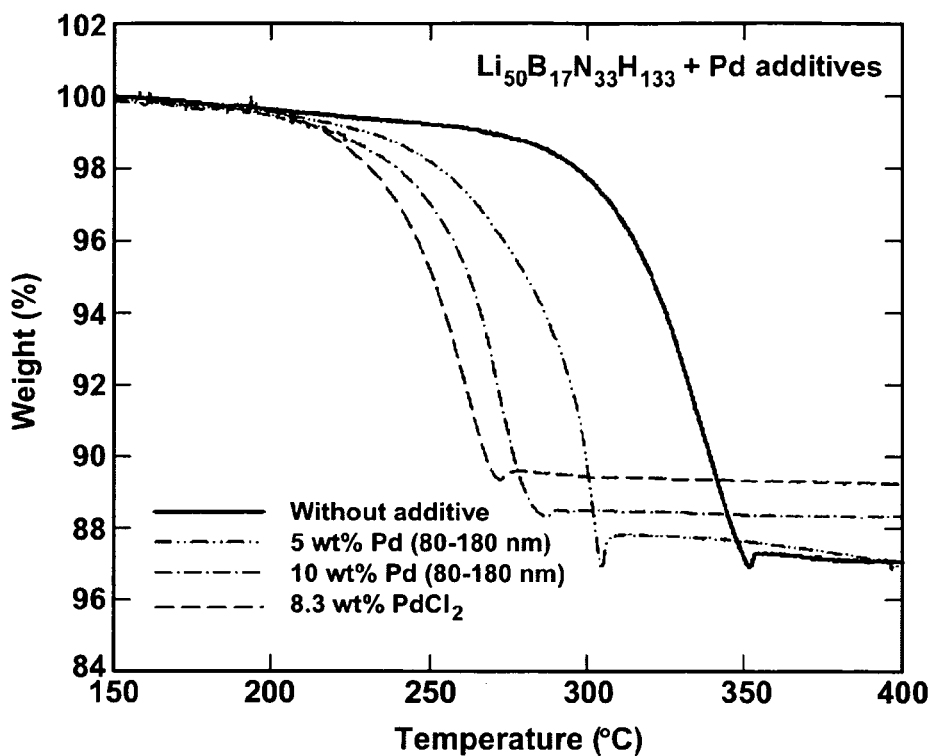
FIG. 1 is a graph of TGA data presenting sample weight loss (%) vs. temperature (° C.) showing the effect of Pd additions on hydrogen desorption from $Li_{50}B_{17}N_{33}H_{133}$. The solid curve is for the weight loss of $Li_{50}B_{17}N_{33}H_{133}$ due to evolution of hydrogen without an additive and the other three curves are for additions to $Li_{50}B_{17}N_{33}H_{133}$ of 5 wt % Pd powder (80-180 nm), 10 wt % Pd powder (80-180 nm), and 8.3 wt % $PdCl_2$ respectively.

Samples of $Li_{50}B_{17}N_{33}H_{133}$ containing additives were prepared by a ball-milling technique as described in the parent application of this case and in the Journal of Physical Chemistry article identified above in this specification. In each experiment powders of $LiNH_2$ (Aldrich, 95% purity) and $LiBH_4$ (Lancaster, 95% purity) were mixed in a 2:1 molar ratio to a total weight of 1 gram, to which was added the desired weight fraction of a metal or metal chloride. The combined powder was loaded under Ar inert gas into a hardened steel ball mill jar along with one large and two small steel balls, and ball milled for 5 hrs in a SPEX 8000 Mixer/Mill. X-ray diffraction analyses confirmed that the ball milled precursor powders had fully converted to the phase tentatively identified as $Li_3BN_2H_8$.

Hydrogen gas release from the samples was measured using two kinds of gravimetric apparatus. Ambient pressure (100 kPa) gravimetry under flowing Ar gas was performed with a Perkin-Elmer Model TGA7 thermogravimetric analyzer (TGA) using 1.5 to 2 mg samples sealed into Al pans having a 50 μm diameter hole in the lid to provide egress for the evolved gas. Decomposition was monitored as a decrease in sample weight while heating, typically at 5° C./min, from 30° C. to 400° C. in a 45 sccm flow of argon gas at 100 kPa.

Near-ambient (130 kPa) and high-pressure gravimetry in flowing He or flowing $H_2$ gas were performed in a Cahn Model 2151 high-pressure TGA. Typically about 300 mg of powder was loaded into an open quartz sample bucket in a glove box and protected during transfer to the TGA by covering the sample with anhydrous pentane. The composition of the TGA exhaust gas was monitored by residual gas analyzer (RGA) mass spectrometry to detect $H_2$ and $NH_3$ emissions.

Temperature-dependent in situ x-ray diffraction (XRD) experiments were performed with a Bruker AXS General Area Detector Diffractometer System (GADDS). The XRD sample was loaded under Ar into a 1.0 mm diameter quartz capillary tube and mounted onto a pressure manifold within the GADDS system so that the pressure increase associated with hydrogen release could be monitored simultaneously with the temperature-dependent XRD pattern.

Transmission electron microscopy (TEM) images were obtained using a Philips 430 T TEM operated at 300 kV. To avoid air contamination, the samples were prepared in an Ar inert gas glove box and transferred to the microscope with a vacuum transfer TEM sample holder. Samples were prepared by sprinkling a small amount of material onto a lacy carbon TEM grid.

Evaluation of Additives for Enhanced Hydrogen Release

Following is a description of the evaluation of candidate materials tested for enhancing the release of hydrogen from $Li_{50}B_{17}N_{33}H_{133}$, a representative member of the family of hydrogen storage materials described and claimed in the parent application of this application. Table 1 includes a listing of the metal additives that were tested and gives the weight fraction of metal additive, expressed as a percent, based on the weight of the $Li_{50}B_{17}N_{33}H_{133}$, and the corresponding mole fraction of metal additive per mole of lithium in the $Li_{50}B_{17}N_{33}H_{133}$ (except for the Vulcan carbon and graphite additives, where it represents moles of carbon), expressed as a percent. Table 1 also presents the particle size of the additive powder prior to milling, and an estimate of the equivalent specific surface area of the additive before milling. A distribution comprised of a large number of very small, well-dispersed particles is characterized by high specific surface area.

Titanium Chloride Additions

Small additions of $TiCl_3$ are known to be exceptionally effective for improving the kinetics of de-hydrogenation and re-hydrogenation in $NaAlH_4$. Its presence facilitates the reversible transformation $NaAlH_4 \leftrightarrow 1/3\ Na_3AlH_6 + 2/3\ Al+H_2$ below the $NaAlH_4$ melting temperature at 178° C., dramatically improves the kinetics of this reaction and the subsequent decomposition to $NaH+Al+3/2H_2$, and makes possible re-hydrogenation to the $NaAlH_4$ phase on practical time scales and at experimentally accessible $H_2$ pressures and temperatures. Adding a few mole % of $TiCl_3$ has been similarly effective in $LiBH_4$ destabilized by $MgH_2$. While it is therefore a natural first choice as an additive to help promote the decomposition of $Li_{50}B_{17}N_{33}H_{133}$, it was found that $TiCl_3$ has little effect in $Li_{50}B_{17}N_{33}H_{133}$. Comparison of three different pairs of TGA scans with and without $TiCl_3$ additions gave an average shift of only $\Delta T_{1/2}=-6°$ C. (see Table 1 below).

Palladium Additions

Adding 5 wt % of 80-180 nm diameter Pd powder is effective in reducing the $H_2$ gas release temperature from $Li_{50}B_{17}N_{33}H_{133}$ by $\Delta T_{1/2}=-43°$ C., as shown in FIG. 1 and Table 1. Doubling the Pd content to 10 wt % further improves $\Delta T_{1/2}=-64°$ C. That the temperature shift only improves by 50% with twice the Pd content suggests that $\Delta T_{1/2}$ saturates at higher Pd content, consistent with a picture in which the effectiveness of the additive depends on its degree of dispersion within the $Li_{50}B_{17}N_{33}H_{133}$ material. It is emphasized that the stated particle size is that of the starting powder prior to milling; it is not known whether further size reduction occurs during the high-energy ball milling.

Addition of Pd in the form of $PdCl_2$ promotes hydrogen release even more effectively. The curve in FIG. 1 demonstrates a temperature reduction of $\Delta T_{1/2}=-76°$ C. in a $Li_{50}B_{17}N_{33}H_{133}$ sample containing 8.3 wt % $PdCl_2$, i.e., having the same Pd concentration as the 5 wt % Pd powder sample. XRD reveals that Pd is present as $PdH_{0.7}$ rather than as the chloride. Evidently some of the Li from $Li_{50}B_{17}N_{33}H_{133}$ reduces $PdCl_2$ to form LiCl; such a mechanism is consistent with the greater thermodynamic stability of LiCl ($\Delta H=-408$ kJ/mole Cl) compared to $PdCl_2$ ($\Delta H=-100$ kJ/mole Cl).

Platinum Additions

Pt was added either as 150-450 nm diameter Pt powder, as Pt/Vulcan carbon, or as 6.8 wt % $PtCl_2$. The Pt/Vulcan carbon is comprised of 2 nm diameter Pt nanoparticles deposited on high surface area Vulcan carbon to inhibit agglomeration, and contains approximately 50% Pt by weight. A preliminary TEM examination of a $Li_{50}B_{17}N_{33}H_{133+5}$ wt % Pt/Vulcan carbon sample shows that some transfer of Pt nanoparticles from the carbon into the $Li_{50}B_{17}N_{33}H_{133}$ material occurred during milling, but that the Pt nanoparticle morphology was otherwise unaffected.

Figure 2:
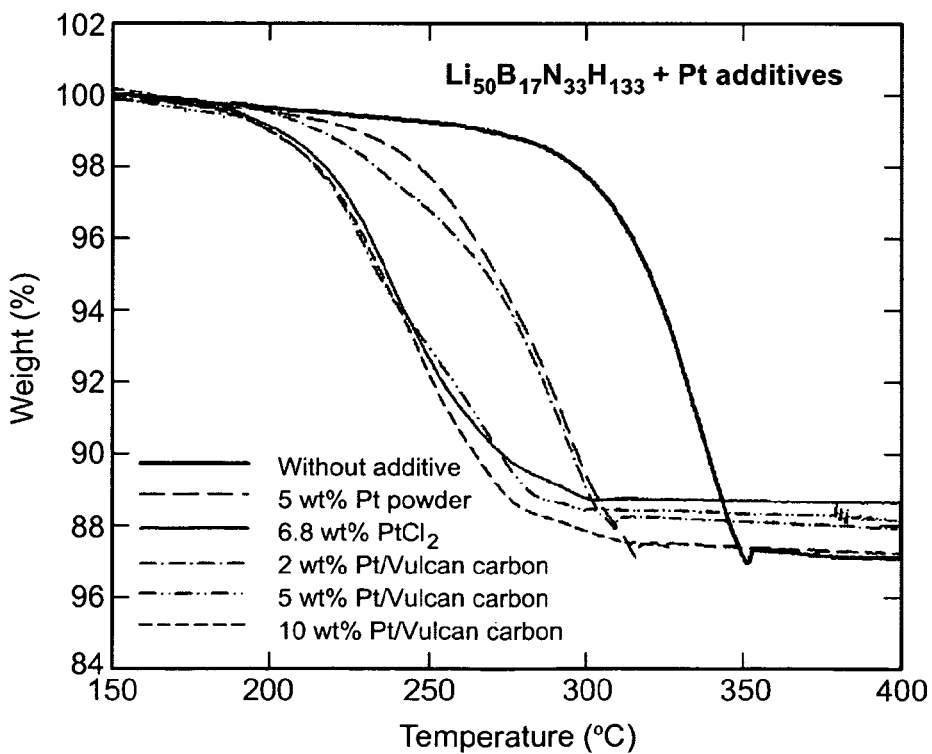
FIG. 2 is a graph of TGA data presenting weight loss (%) vs. temperature (° C.) showing the effect of Pt additions on hydrogen desorption from $Li_{50}B_{17}N_{33}H_{133}$. The solid curve is for the weight loss of $Li_{50}B_{17}N_{33}H_{133}$ due to hydrogen evolution without an additive, and the other curves are for additions to $Li_{50}B_{17}N_{33}H_{133}$ of various forms and amounts of platinum as indicated in the Figure.

Weight loss from a sample containing 5 wt % Pt powder is shown in FIG. 2. The reduction in release temperature, $\Delta T_{1/2}=-49°$ C., is similar to that of the 5 wt % Pd powder. Pt achieves this effect with only about half as much metal on a mole fraction basis, and with larger particles compared to the Pd powder (as reflected in its lower specific surface area, see Table 1). It is therefore concluded that Pt is more chemically active than Pd in releasing hydrogen from $Li_{50}B_{17}N_{33}H_{133}$.

A selected series of weight loss curves for Pt/Vulcan carbon concentrations from 1 to 10 wt % are shown in FIG. 2. The 2 wt % Pt/Vulcan carbon sample (which is actually 1 wt % Pt) has about the same behavior as the 5 wt % Pt powder sample; its ~5 times greater efficacy is attributed to the smaller Pt particle size and greater dispersal (as indicated by its high specific surface area). The reduction in hydrogen release temperature saturates at about $\Delta T=90°$ C. near 5 wt % Pt/Vulcan carbon. For comparison, a measurement is included in Table 1 for a sample with 2.4 wt % Vulcan carbon without Pt, roughly equivalent to the carbon content of the 5 wt % Pt/Vulcan carbon sample, to demonstrate that the Vulcan carbon itself has no effect other than as a support for the Pt nanoparticles. Graphite also has no effect, see Table 1. Unlike the Pt powder additive, where Pt diffraction peaks are clearly visible in the XRD pattern, the Pt nanoparticles in Pt/Vulcan carbon are too small to be detected with XRD.

The platinum content of $PtCl_2$ at 6.82 wt % additive to $Li_{50}B_{17}N_{33}H_{133}$ is equivalent to 5 wt % platinum powder or 10 wt % Pt/Vulcan carbon (which is 50 wt % Pt nanoparticles) as hydrogen release additives. As seen in FIG. 2 and Table 1, the results in hydrogen release temperature shift for the platinum salt is essentially identical to those for Pt/Vulcan carbon with the same amount of platinum. Thus, the addition of platinum as a salt appears to disperse the platinum within $Li_{50}B_{17}N_{33}H_{133}$ as effectively as the Pt/Vulcan carbon is dispersed.

Iron Additions

Adding Fe as $FeCl_2$ improved the dehydrogenation behavior, as demonstrated in Table 1, even though there was less Fe present compared to the Fe powder addition. The temperature, $T_{1/2}$, at which the dehydrogenation weight loss reached half of the total loss was changed by a modest $\Delta T_{1/2}=-36°$ C. It is inferred that some of the Li from $Li_{50}B_{17}N_{33}H_{133}$ formed LiCl and reduced $FeCl_2$ to the metal, resulting in a better dispersion of smaller metal particles compared to the powder addition. Such a mechanism is consistent with the greater thermodynamic stability of LiCl ($\Delta H=-408$ kJ/mole Cl) compared to $FeCl_2$ ($\Delta H=-171$ kJ/mole Cl).

Zinc Additions

In contrast, $ZnCl_2$ addition had no effect, even though its formation enthalpy ($\Delta H=-208$ kJ/mole Cl) suggests that it too should be reduced to the metal by Li. For the small quantities of metal chloride additions considered here, XRD typically is not sensitive enough to show evidence for the metal chloride, the metal, or LiCl in the diffraction pattern of either the as-milled or the dehydrogenated material. In the case of $ZnCl_2$, however, XRD of the dehydrogenated product showed the usual mixture of $Li_3BN_2$ polymorphs, but with three additional diffraction peaks at about 37.2°, 41°, and 42.7°. These peaks were not identified as belonging to any known Zn-containing phases, but it nevertheless raises the possibility that Zn is ineffective because it forms an intermetallic phase.

Nickel Additions

Figure 3:
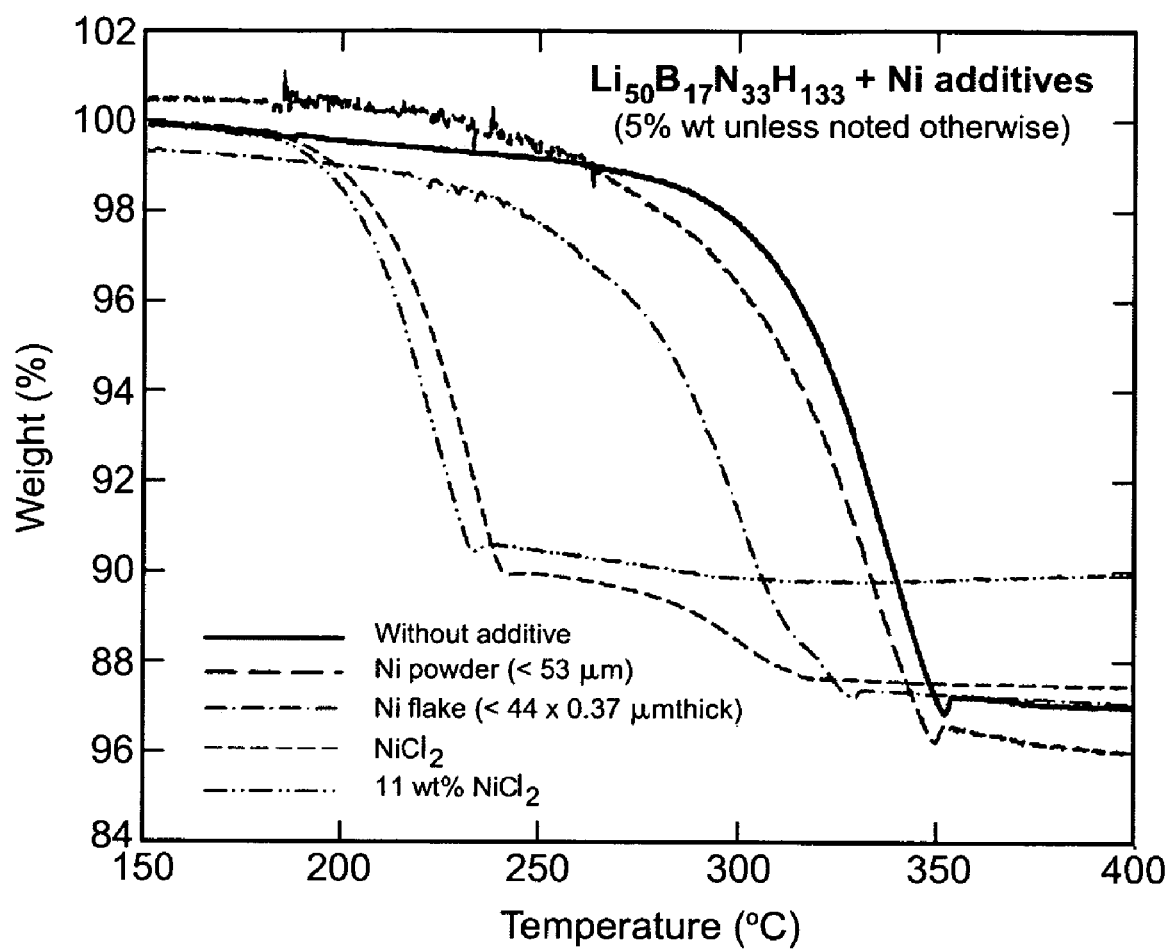
FIG. 3 is a graph of TGA data presenting weight loss (%) vs. temperature (° C.) showing the effect of Ni additions on hydrogen desorption from $Li_{50}B_{17}N_{33}H_{133}$. The solid curve is for the weight loss of $Li_{50}B_{17}N_{33}H_{133}$ without an additive and the other four curves are for additions to $Li_{50}B_{17}N_{33}H_{133}$ of selected forms and amounts of nickel as indicated in the Figure.

The effect on dehydrogenation is shown in FIG. 3 for a variety of Ni additives. Ni powder (long dashed curve) provides a minor improvement of $T_{1/2}$, see Table 1, with particles about three times smaller than those of the Fe powder. A much more substantial reduction in dehydrogenation temperature is observed for the Ni flake (dash-dotted curve). The flake particles have lateral dimensions comparable to the diameter of the Ni powder, but they are two orders of magnitude smaller across the thickness. The resulting ~20-fold increase in specific surface area implies a much higher number of more widely dispersed metal particles. Similar results are observed for high surface area Raney Ni 2800 particles, and even better results are obtained for Ni nanoparticles with dimensions smaller than 40 nm, see Table 1.

Dramatic improvement is obtained by adding $NiCl_2$, as illustrated in FIG. 3. The hydrogen release curve for $NiCl_2$ in FIG. 3 may be compared with the TGA curve for 10 wt % Pt/Vulcan carbon in FIG. 2. Adding 5 wt % $NiCl_2$ lowers the dehydrogenation temperature by $\Delta T_{1/2}=$ −104° C., and increasing the $NiCl_2$ content to 11 wt % (corresponding to the 5 wt % Ni used for the other Ni additives) gives $\Delta T_{1/2}$=−112° C. Similar to Pt/Vulcan carbon, where the impact on dehydrogenation saturated at about $\Delta T_{1/2}$=−90° C., the effect of 11 wt % $NiCl_2$ appears to be at or close to saturation. It can be seen by comparing the data summarized in Table 1 that Pt addition is more effective on a molar basis. $NiCl_2$ is much more efficient, however, on the basis of weight, cost, and temperature reduction at saturation.

The following Table 1 lists the above described additives to $Li_{50}B_{17}N_{33}H_{133}$ that were evaluated for enhancing hydrogen release. Again, the basis of comparison for the additives is the midpoint of decomposition weight loss for additive-free $Li_{50}B_{17}N_{33}H_{133}$: $T_{1/2}$=328.6° C.

| Additive | Wt (%) | Mole % | Particle size (μm) | Specific surface area (m²/g) | $\Delta T_{1/2}$ (° C.) | $T_{1/2}$ (° C.) |
|---|---|---|---|---|---|---|
| $TiCl_3$ | 5 | 0.7 | | | −6 | 324.7 |
| Pd | 5 | 1.1 | 0.08–0.18 | ~4 | −43 | 286.1 |
| | 10 | 2.1 | | | −64 | 264.6 |
| $PdCl_2$ | 8.3 | 1.1 | | | −76 | 252.3 |
| Pt | 5 | 0.6 | 0.15–0.45 | ~1 | −49 | 279.3 |
| Pt/Vulcan carbon | 1 | 0.06 | 0.002 (2 nm) | ~140 | −38 | 290.4 |
| | 2 | 0.12 | | | −53 | 276.1 |
| | 3 | 0.17 | | | −69 | 259.2 |
| | 5 | 0.29 | | | −90 | 239.1 |
| | 10 | 0.58 | | | −87 | 241.4 |
| $PtCl_2$ | 6.82 | 0.6 | | | −89 | 239.5 |
| Vulcan carbon | 2.4 | 4.5 | | 250 | +1 | 329.8 |
| Graphite | 2 | 3.8 | 250–850 | ~3 × 10⁻³ | −3 | 325.7 |
| Zn | 5 | 1.7 | ≦150 | ~10⁻² | −4 | 324.6 |
| $ZnCl_2$ | 5 | 0.8 | | | −8 | 320.7 |
| Fe | 5 | 2.0 | <100 | ~10⁻² | −7 | 321.8 |
| $FeCl_2$ | 5 | 0.9 | | | −36 | 293.1 |
| Ni | 5 | 1.9 | ≦53 | ~10⁻² | −11 | 317.9 |
| Ni flake | 5 | 1.9 | ≦44 × 0.37 thick | ~0.6 | −36 | 292.8 |
| Raney Ni 2800 | 5 | 1.9 | | 50–100 | −44 | 284.9 |
| Nanosized Ni | 5 | 1.9 | <0.04 | ~20 | −63 | 265.4 |
| $NiCl_2$ | 5 | 0.9 | 0.01 (10 nm) | ~70 | −104 | 224.2 |
| | 11 | 1.9 | | | −112 | 217.0 |

The above data demonstrate the varying effectiveness of several metals including palladium, platinum, iron, and nickel in promoting hydrogen release from $Li_{50}B_{17}N_{33}H_{133}$. It is also seen that $NiCl_2$ additions are highly effective in promoting hydrogen release. Adding 11 wt % $NiCl_2$ to $Li_{50}B_{17}N_{33}H_{133}$ reduced the midpoint temperature of hydrogen release by $\Delta T_{1/2}$=−112° C. compared to additive-free $Li_{50}B_{17}N_{33}H_{133}$, an improvement of 22° C. over the best result for comparable Pt/Vulcan carbon additions. $NiCl_2$ is also superior in cost and availability. Hydrogen release was detected by mass spectrometry at temperatures as low as ~120° C. The quantity of $NH_3$ simultaneously released during dehydrogenation is decreased by more than an order of magnitude compared to additive-free material, and is a factor of 4 or more lower than Pt/Vulcan carbon-added samples. This improvement is attributed to higher $H_2$ release kinetics at lower temperatures, where thermally activated $NH_3$ release remains slow.

In-situ XRD shows that dehydrogenation is accompanied by formation of one or more new hydrogen-deficient intermediate phases at about 200° C. The increased XRD background intensity above 190° C. suggests partial melting of $Li_{50}B_{17}N_{33}H_{133}$ concurrent with $H_2$ release, thus dehydrogenation may still be mediated through the liquid. It is hypothesized that as the $Li_{50}B_{17}N_{33}H_{133}$ begins to melt the liquid immediately dehydrogenates in the presence of Ni nanoparticles to form the intermediate solid. It is unclear whether the $H_2$ release that occurs below 190° C. is accompanied by melting of a small fraction of the $Li_{50}B_{17}N_{33}H_{133}$.

While the mechanism by which metal additives promote hydrogen release is undetermined, the highly dispersed nanoparticle distribution revealed by TEM strongly suggests that Ni, Fe, Pd, and Pt act as dehydrogenation catalysts for $Li_{50}B_{17}N_{33}H_{133}$ and, likely, for other members of the related family of hydrogen-rich hydrides. As described, these metal catalysts may used in a variety of forms. In one form, very small particles of the metal elements may be dispersed with the hydrogen storage material. In another form, nanosize particles of the metal are carried on high specific surface area carbon particles. And in still another form, each of the metals has been effectively used in the form of small particles of a compound such as a halide salt. In an example of this form, small particles of the chlorides of iron, nickel, palladium and platinum have proven to be a very effective means for dispersing these catalytic metal elements with the particles of hydrogen storage materials.

In general, an amount of metal-containing additive is employed to provide an effective amount of the metal for reducing $T_{1/2}$ of hydrogen release from the hydrogen storage material without an unacceptable increase in the weight and volume of the additive and storage material mixture. As illustrated in the above examples, increased amounts of the same additive form often yield smaller incremental reductions in $T_{1/2}$. However, there may be situations in which larger weights or volumes of the hydrogen storage material are acceptable for increased hydrogen recovery. Then the additive can be used in amounts that are a substantial fraction of the hydrogen storage material, for example up to about twenty-five weight percent of the hydrogen-rich storage material or more.

While the practice of the invention has been illustrated in terms of some examples the scope of the invention is not to be limited by described embodiments.

The invention claimed is:

1. A hydrogen storage composition comprising:
   particles of one or more compositions of the formula $M'_xM''_yN_zH_d$ and a metal additive or a metal-containing additive dispersed with the particles for enhancing the thermal release of hydrogen from $M'_xM''_yN_zH_d$, wherein $M'_xM''_yN_zH_d$
   (a) M' is a cation selected from the group consisting of: Li, Ca, Na, Mg, K, Be, and mixtures thereof and x is in the range from about 50 to about 53;
   (b) M" comprises a cation composition comprising a Group 13 element of the Periodic Table and y is in the range from about 5 to about 34;
   (c) N is nitrogen and z is in the range from about 16 to about 45;
   (d) H is hydrogen, and in a fully hydrogenated state of the hydrogen storage composition, d is in the range from about 110 to about 177; and
   (e) wherein M', M", x, y, z, and d are selected so as to maintain electroneutrality.

2. A hydrogen storage composition as recited in claim 1 in which the metal or metal-containing additive for dispersion contains one or more metal elements selected from the group consisting of iron, nickel, palladium, and platinum.

3. A hydrogen storage composition as recited in claim 1 in which the metal or metal-containing additive for dispersion contains one or more elements selected from the group consisting of iron, nickel, palladium, and platinum, the metal constituent of the additive being included in an amount up to about twenty-five weight percent of the particles of $M'_xM''_yN_zH_d$.

4. A hydrogen storage composition as recited in claim 1 in which the metal or metal-containing additive for dispersion contains one or more metal chlorides selected from the group consisting of iron(II) chloride, nickel(II) chloride, palladium(II) chloride, and platinum(II) chloride.

5. A hydrogen storage composition as recited in claim 1 in which the metal or metal-containing additive for dispersion contains one or more metal chlorides selected from the group consisting of iron(II) chloride, nickel(II) chloride, palladium(II) chloride, and platinum(II) chloride, the metal constituent(s) of the additive being included in an amount up to about twenty-five weight percent of the particles of $M'_xM''_yN_zH_d$.

6. A hydrogen storage composition as recited in claim 1 in which the metal-containing additive comprises nanometer size particles of platinum carried on carbon particles.

7. A hydrogen storage material comprising particles of $Li_{50}B_{17}N_{33}H_{133}$ average composition and a metal additive or a metal-containing additive dispersed with the particles for reducing the $T_{1/2}$ of the release of hydrogen from $Li_{50}B_{17}N_{33}H_{133}$.

8. A hydrogen storage composition as recited in claim 7 in which the metal or metal-containing additive for dispersion contains one or more elements selected from the group consisting of iron, nickel, palladium, and platinum.

9. A hydrogen storage composition as recited in claim 7 in which the metal or metal-containing additive for dispersion contains one or more elements selected from the group consisting of iron, nickel, palladium, and platinum, the metal constituent of the additive being included in an amount up to about twenty-five weight percent of the particles of $Li_{50}B_{17}N_{33}H_{133}$.

10. A hydrogen storage composition as recited in claim 7 in which the metal-containing additive for dispersion contains one or more metal chlorides selected from the group consisting of iron(II) chloride, nickel(II) chloride, palladium(II) chloride, and platinum(II) chloride.

11. A hydrogen storage composition as recited in claim 7 in which the metal additive for dispersion contains one or more metal chlorides selected from the group consisting of iron(II) chloride, nickel(II) chloride, palladium(II) chloride, and platinum(II) chloride, the metal constituent(s) of the additive being included in an amount up to about twenty-five weight percent of the particles of $Li_{50}B_{17}N_{33}H_{133}$.

12. A hydrogen storage composition as recited in claim 7 in which the metal-containing additive comprises nanometer size particles of platinum carried on carbon particles.

13. A method of making a hydrogen storage composition for enhanced release of hydrogen, the method comprising:
mixing $LiNH_2$ and $LiBH_4$ with a metal additive or a metal-containing additive to form particles comprising $Li_xB_yN_zH_d$ with dispersed additive, the additive reducing $T_{1/2}$ of the release of hydrogen from the particles of $Li_xB_yN_zH_d$, wherein $Li_xB_yN_zH_d$ (a) x is in the range from about 50 to about 53;
(b) y is in the range from about 5 to about 34;
(c) z is in the range from about 16 to about 45;
(d) d is in the range from about 110 to about 177; and
(e) wherein Li, B, x, y, z, and d are selected so as to maintain electroneutrality.

14. A method of making a hydrogen storage composition as recited in claim 13 in which the metal or metal-containing additive for dispersion contains one or more elements selected from the group consisting of iron, nickel, palladium, and platinum.

15. A method of making a hydrogen storage material as recited in claim 13 comprising mixing $LiNH_2$ and $LiBH_4$ with a metal additive or a metal-containing additive to form particles of $Li_{50}B_{17}N_{33}H_{133}$ average composition with dispersed additive, the additive reducing $T_{1/2}$ of the release of hydrogen from the particles of $Li_{50}B_{17}N_{33}H_{133}$.

16. A method of making a hydrogen storage material as recited in claim 15 in which the metal or metal-containing additive for dispersion contains one or more elements selected from the group consisting of iron, nickel, palladium, and platinum.

17. A method of making a hydrogen storage composition as recited in claim 15 in which the metal or metal-containing additive for dispersion contains one or more elements selected from the group consisting of iron, nickel, palladium, and platinum, the metal constituent of the additive being included in an amount up to about twenty-five weight percent of the particles of $Li_{50}B_{17}N_{33}H_{133}$.

18. A method of making a hydrogen storage composition as recited in claim 15 in which the metal or metal-containing additive for dispersion contains one or more chlorides selected from the group consisting of iron(II) chloride, nickel(II) chloride, palladium(II) chloride, and platinum(II) chloride.

19. A method of making a hydrogen storage composition as recited in claim 15 in which the metal or metal-containing additive for dispersion contains one or more chlorides selected from the group consisting of iron(II) chloride, nickel(II) chloride, palladium(II) chloride, and platinum(II) chloride, the metal constituent(s) of the additive being included in an amount up to about twenty-five weight percent of the particles of $Li_{50}B_{17}N_{33}H_{133}$.

20. A method of making a hydrogen storage composition as recited in claim 15 in which the metal-containing additive comprises nanometer size particles of platinum carried on carbon particles.

* * * * *